(12) United States Patent
Shinotsuka

(10) Patent No.: US 7,241,549 B2
(45) Date of Patent: Jul. 10, 2007

(54) INFORMATION RECORDING MEDIUM

(75) Inventor: Michiaki Shinotsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 225 days.

(21) Appl. No.: 10/245,404

(22) Filed: Sep. 17, 2002

(65) Prior Publication Data

US 2003/0081537 A1    May 1, 2003

(30) Foreign Application Priority Data

Sep. 18, 2001 (JP) ............................ 2001-283251
Oct. 2, 2001 (JP) ............................ 2001-306408
Nov. 27, 2001 (JP) ............................ 2001-360178

(51) Int. Cl.
*G11B 7/24* (2006.01)

(52) U.S. Cl. ............... 430/230.13; 430/945; 428/64.4; 428/64.5; 369/275.5; 369/272; 369/275.2

(58) Field of Classification Search ........... 430/270.13; 428/64.4; 369/272, 275.5

See application file for complete search history.

(56) References Cited

U.S. PATENT DOCUMENTS

| | | | | |
|---|---|---|---|---|
| 5,194,363 A | * | 3/1993 | Yoshioka et al. ...... | 430/240.13 |
| 5,251,202 A | | 10/1993 | Kaneko et al. | |
| 5,298,305 A | | 3/1994 | Shinozuka et al. | |
| 5,521,901 A | * | 5/1996 | Okada et al. ............. | 369/275.2 |
| 5,736,657 A | | 4/1998 | Ide et al. | |
| 5,741,603 A | * | 4/1998 | Yasuda ...................... | 428/64.1 |
| 6,018,510 A | | 1/2000 | Abe et al. | |
| 6,086,796 A | * | 7/2000 | Brown et al. ............... | 264/1.33 |
| 6,096,398 A | | 8/2000 | Yuzurihara et al. | |
| 6,192,024 B1 | * | 2/2001 | Inoue et al. ............. | 369/275.3 |
| 6,221,557 B1 | | 4/2001 | Harigaya et al. | |
| 6,268,034 B1 | * | 7/2001 | Kitaura et al. ............. | 428/64.1 |
| 6,296,915 B1 | * | 10/2001 | Yusu et al. ................ | 428/64.1 |
| 6,319,368 B1 | | 11/2001 | Ide et al. | |

(Continued)

FOREIGN PATENT DOCUMENTS

EP        917137    *   5/1999

(Continued)

OTHER PUBLICATIONS

U.S. Appl. No. 10/029,100, filed Dec. 21, 2001.

(Continued)

*Primary Examiner*—Martin Angebranndt
(74) *Attorney, Agent, or Firm*—Cooper & Dunham LLP

(57) ABSTRACT

An optical recording medium configured with a light reflection layer; a first protection layer; a recording layer containing a phase-change material which changes between crystalline and amorphous phases by a light irradiation; a second protection layer; and one of a cover layer and a protective coating layer disposed on a substrate in this order; and in which the light reflection layer is formed of one of an Al alloy and an Ag alloy; the first protection layer has a $ZnS\text{—}SiO_2$ mixture layer which contains a mixture of ZnS and $SiO_2$, and a intermediate layer having higher thermal conductivity than the $ZnS\text{—}SiO_2$ mixture layer; the intermediate layer is formed on the side of the light reflection layer; the recording layer comprises Ge, Sb, and Te as main elements; and the second protection layer comprises a mixture of ZnS and $SiO_2$.

15 Claims, 8 Drawing Sheets

Layer Thickness Ratio (AlN layer thickness/ZnS-SiO₂ layer thickness)

U.S. PATENT DOCUMENTS

| | | | |
|---|---|---|---|
| 6,567,367 B2 * | 5/2003 | Ohno et al. | 369/116 |
| 6,723,410 B2 * | 4/2004 | Ohno et al. | 428/64.1 |
| 6,731,590 B1 * | 5/2004 | Shingai et al. | 369/286 |
| 7,005,172 B2 * | 2/2006 | Shinkai et al. | 428/64.1 |
| 2002/0168587 A1 * | 11/2002 | Sakaue et al. | 430/270.13 |
| 2004/0115386 A1 * | 6/2004 | Shinkai et al. | 428/64.1 |
| 2005/0180307 A1 * | 8/2005 | Kuroda et al. | 369/283 |

FOREIGN PATENT DOCUMENTS

| | | | |
|---|---|---|---|
| EP | 1065663 | * | 1/2001 |
| JP | 61258787 | | 11/1986 |
| JP | 62152786 | | 7/1987 |
| JP | 1211249 | | 8/1989 |
| JP | 1-277338 | | 11/1989 |
| JP | 6253886 | | 9/1994 |
| JP | 2000-331378 | * | 11/2000 |
| JP | 2001-184725 | | 7/2001 |

OTHER PUBLICATIONS

U.S. Appl. No. 09/956,637, filed Sep. 19, 2001.
U.S. Appl. No. 10/119,193, filed Apr. 10, 2002.
U.S. Appl. No. 09/236,446, filed Jan. 25, 1999.
Nobuo Akahira et al. (Jul. 1995), "High Density Recording On Phase Change Optical Disks", Optical Data Storage '95, vol. 2514, pp. 294-301.
Kees Schep et al. (Sep. 2000), "Format Description And Evaluation Of The 22.5 GB DVR Disc", ISOM Techinical Digest 2000, pp. 210-211.
Mar. 7, 2006 Japanese official action, w/o translation.

* cited by examiner

Layer Thickness Ratio (AlN layer thickness/ZnS-SiO2 layer thickness)

Layer Thickness Ratio (Al2O3 layer thickness/ZnS-SiO2 layer thickness)

Layer Thickness Ratio (Ta2O5 layer thickness/ZnS-SiO2 layer thickness)

Layer Thickness Ratio (AlN layer thickness/reflective heat dissipation layer thickness)

Layer Thickness Ratio (Al2O3 layer thickness/reflective heat dissipation layer thickness)

Layer Thickness Ratio (Ta2O5 layer thickness/reflective heat dissipation layer thickness)

INFORMATION RECORDING MEDIUM

BACKGROUND OF THE INVENTION

1. Field of the Invention

The present invention relates to an optical recording medium such as a rewritable DVR, comprising a phase-change recording layer for high density recording.

2. Description of the Related Art

In general, recording of a binary signal and detecting of tracking signal in a compact disc (CD) or DVD is carried out utilizing a change of reflectivity caused by interference of reflected light from the bottom of a concave pit as well as a mirror finished surface. Recently, phase-change rewritable compact disc (CD-RW, or CD-Rewritable) has been generally used as the medium compatible with CD. Moreover, regarding DVD, various types of phase-change rewritable DVD have been proposed. Furthermore, it is proposed that the wavelength for recording and reproducing be shortened to 390 nm to 420 nm for a DVD capacity of 4.7 GB, which leads to increasing the numerical aperture (NA) and to realizing a DVR with the capacity of 20 GB or more (Refer to page. 210: *ISOM Technical Digest* 2000).

The detection of the recorded information signal in these phase-change rewritable CDs, DVDs, and DVRs is performed by using the changes of reflection rate and phase differences caused by the difference of refractive index between amorphous and crystalline states. A phase-change medium, in general, comprises a bottom protection layer, a phase-change recording layer, an upper protection layer, and a light reflection layer on a substrate. Controlling the reflection rate and phase differences by the multiple interactions of those layers makes it possible to provide the compatibility with CD and DVD. In CD-RW, it is possible to secure the compatibility of a recorded signal and channel signal in the range having a lowered reflection rate of 15% to 25%, thus enabling reproducing information in a CD drive to which an amplifier is added to cover the low reflection rate.

Since the deleting and over recording processes in phase-change recording medium can be performed solely by the modulation in strength of one converging light beam, in phase-change recording medium such as CD-RW, rewritable DVD and the like, a method of recording includes overwrite recording, in which recording and deleting are performed Simultaneously. In recording information utilizing a change of phase, it is common that rewritable phase change recording medium in practical use utilize a crystalline state as the unrecorded/deleted states, and form an amorphous mark for recording, although one of the crystalline/amorphous states and the mixed states can be used, as well as plurality of crystalline phases. For the material of the recording layer, chalcogen elements, which are chalcogenide alloys including S, Se, and Te, are mainly used.

Examples include the GeSbTe mainly comprising the GeTe—$Sb_2Te_3$ pseudobinary dual alloy, the InSbTe mainly comprising InTe—$Sb_2Te_3$ pseudobinary dual alloy, and AgInSbTe alloy and GeSnTe mainly comprising Sb0.7Te3.3 eutectic system. Among these, the types in which over-exceeding Sb is added to a GeTe—$Sb_2Te_3$ pseudobinary dual alloy, especially compositions in the neighborhood of intermetallic compounds such as $Ge_1Sb_2Te_4$, $Ge_2Sb_2Te_5$, and the like, have been practically used.

These compositions are characterized by crystallization which does not accompany a phase separation peculiar to an intermetallic compound. The crystal growth rate is fast, resulting in easy initialization and fast recrystallization rate on erasing. Therefore, for a recording layer providing more practical overwriting property, the related art focuses on pseudobinary dual alloy and on the compositions in the neighborhood of an intermetallic compound. (Refer to *Jpn. J. Appl. Phys.*, vol. 69 (1991), p 2849 or *SPIE*, vol. 2514 (1995), pp 294–301, etc.)

Moreover, the related art has disclosed compositions of recording layers having a GeSbTe ternary composition or containing additional elements, regarding the host material of the ternary composition. Japanese Patent Application Laid-Open (JP-A) No. 61-258787, JP-A No. 62-53886, JP-A No. 62-152786, JP-A No. 01-63195, 01-211249, JP-A No. 01-277338, and so on). However, applying the materials with those compositions to optical recording medium for high density recording, such as rewritable DVD and so on, has just started and there are many problems that should be solved.

SUMMARY OF THE INVENTION

The present invention was developed to eliminate the above-mentioned problems. An object of the present invention is primarily to provide a medium having good recording sensitivity (a role of the ZnS—$SiO_2$) corresponding to a high-speed recording and quenching structure (the roles of the intermediate layer and the heat release layer) in an optical recording medium for high density recording such as rewritable DVD with a phase change recording layer.

The first aspect of the present invention is an optical recording medium comprising: a light reflection layer, a first protection layer, a recording layer containing a phase-change material which changes between crystalline and amorphous phases by a light irradiation, a second protection layer, and one of a cover layer and a protective coating layer disposed on a substrate in this order; wherein, the light reflection layer comprises one of an Al alloy and an Ag alloy; the first protection layer comprises a ZnS—$SiO_2$ mixture layer which contains a mixture of ZnS and $SiO_2$, and a intermediate layer having higher thermal conductivity than the ZnS—$SiO_2$ mixture layer; the intermediate layer is formed on the side of the light reflection layer; the recording layer comprises Ge, Sb, and Te as main elements, and the second protection layer comprises a mixture of ZnS and $SiO_2$. In order to improve the recording sensitivity corresponding to high-speed recording, a ZnS—$SiO_2$ layer is formed. A intermediate layer is formed between ZnS—$SiO_2$ and the heat release layers to make it a quenching structure in order to record at high speed.

The second aspect of the present invention is an optical recording medium according to the first aspect, wherein the light reflection layer comprises an Al alloy, and the intermediate layer of the first protection layer comprises AlN.

The third aspect of the present invention is an optical recording medium according to the first aspect, wherein the reflective heat release layer comprises an Ag alloy, and the intermediate layer of the first protection layer comprises $Al_2O_3$.

The fourth aspect of the present invention is an optical recording medium according to the first aspect, wherein the reflective heat release layer comprises an Al alloy, and the intermediate layer of the first protection layer comprises $Ta_2O_5$.

The fifth aspect of the present invention an optical recording medium according to the first aspect, wherein the intermediate layer in the first protection layer has a thickness ⅕ to ½ times a thickness of the ZnS—$SiO_2$ mixture layer in the first protection layer, which results in possible high density recording at high speed without deterioration of recording sensitivity because of the quenching structure.

The sixth aspect of the present invention is an optical recording medium according to the first aspect, wherein the intermediate layer in the first protection layer has a thickness 0.20 to 0.80 times a thickness of the reflective heat release layer, which results in possible high density recording at high speed without deterioration of recording sensitivity because of the quenching structure.

The seventh aspect of the present invention is an optical recording medium according to the first aspect, wherein a film-thickness of the first protection layer is 5 nm to 30 nm.

The eighth aspect of the present invention is an optical recording medium according to the seventh aspect, wherein a film-thickness of the first protection layer is 25 nm or less.

The ninth aspect of the present invention is an optical recording medium according to the first aspect, wherein a film-thickness of the second protection layer is 5 nm to 30 nm.

The tenth aspect of the present invention is an optical recording medium according to the first aspect, wherein a thickness of the light reflection layer is 30 nm to 300 nm, and a volume resistivity of the light reflection layer is 20 nΩ·m to 150 nΩ·m.

The eleventh aspect of the present invention is an optical recording medium according to the first aspect, comprising a cover layer, wherein the cover layer is formed on an adhesive layer (is formed by intervening an adhesive layer).

The twelfth aspect of the present invention is an optical recording medium according to the eleventh aspect, wherein a hard coating is formed on the cover layer. Forming a hard coating makes it possible not only to correct substrate curvature but also to wipe it when dust is adhered to the surface, making it hard to damage.

The thirteenth aspect of the present invention is an optical recording medium according to the twelfth aspect, wherein a film-thickness of the hard coating is 1 μm to 5 μm.

The fourteenth aspect of the present invention is an optical recording medium according to the first aspect, wherein the substrate is provided with a groove whose average groove width is 0.3 to 0.5 to the track pitch. The average groove width of the substrate was adjusted to 0.3 to 0.5 to the track pitch, which resulted in obtaining high density and high amplitude (high modulation) at the phase change recording layer with Ge, Sb, and Te being the principal constituent elements.

The fifteenth aspect of the present invention is an optical recording medium according to the fourteenth aspect, wherein the groove is either one of a geometric groove or an optically formed groove.

The sixteenth aspect of the present invention is a phase-change optical recording medium comprising: a light reflection layer, a first protection layer, a recording layer, a second protection layer, and one of a cover layer and a protective coating layer disposed on a substrate in this order; and utilizing a phase-change phenomenon which results in changes between crystalline and amorphous phases by a light irradiation, wherein the light reflection layer comprises an Al alloy; the first protection layer comprises a ZnS—SiO$_2$ mixture layer which contains a mixture of ZnS and SiO$_2$, and an AlN layer formed on the side of the light reflection layer; the recording layer comprises Ge, Sb, and Te as main elements; and the second protection layer comprises a mixture of ZnS and SiO$_2$.

The seventeenth aspect of the present invention is an optical recording medium according to the sixteenth aspect, wherein the AlN layer in the first protection layer has a thickness ⅕ to ½ times a thickness of the ZnS—SiO$_2$ mixture layer.

The eighteenth aspect of the present invention is a phase-change optical recording medium comprising: a light reflection layer, a first protection layer, a recording layer, a second protection layer, and one of a cover layer and a protective coating layer disposed on a substrate in this order; and utilizing a phase-change phenomenon which results in changes between crystalline and amorphous phases by a light irradiation, wherein the light reflection layer comprises an Ag alloy; the first protection layer comprises a ZnS—SiO$_2$ mixture layer which contains a mixture of ZnS and SiO$_2$ and an Al$_2$O$_3$ layer formed on the side of the light reflection layer; the recording layer comprises Ge, Sb, and Te as main elements; and the second protection layer comprises a mixture of ZnS and SiO$_2$.

The nineteenth aspect of the present invention is an optical recording medium according to the eighteenth aspect, wherein the Al$_2$O$_3$ layer in the first protection layer has a thickness ⅕ to ½ times a thickness of the ZnS—SiO$_2$ mixture layer.

The twentieth aspect of the present invention is a phase-change optical recording medium, comprising: a light reflection layer, a first protection layer, a recording layer, a second protection layer, and one of a cover layer and a protective coating layer disposed on a substrate in this order; and utilizing a phase-change phenomenon which results in changes between crystalline and amorphous phases by a light irradiation, wherein the light reflection layer comprises an Al alloy; the first protection layer comprises a ZnS—SiO$_2$ mixture layer which contains a mixture of ZnS and SiO$_2$, and a Ta$_2$O$_5$ layer formed on the side of the light reflection layer; the recording layer comprises Ge, Sb, and Te as main elements; and the second protection layer comprises a mixture of ZnS and SiO$_2$.

The twenty first aspect of the present invention is an optical recording medium according to twentieth aspect, wherein the Ta$_2$O$_5$ layer in the first protection layer has a thickness ⅕ to ½ times a thickness of the ZnS—SiO$_2$ mixture layer.

DESCRIPTION OF THE PREFERRED EMBODIMENTS

The optical recording medium of the present invention will be described in further detail hereinafter.

Figure 1:
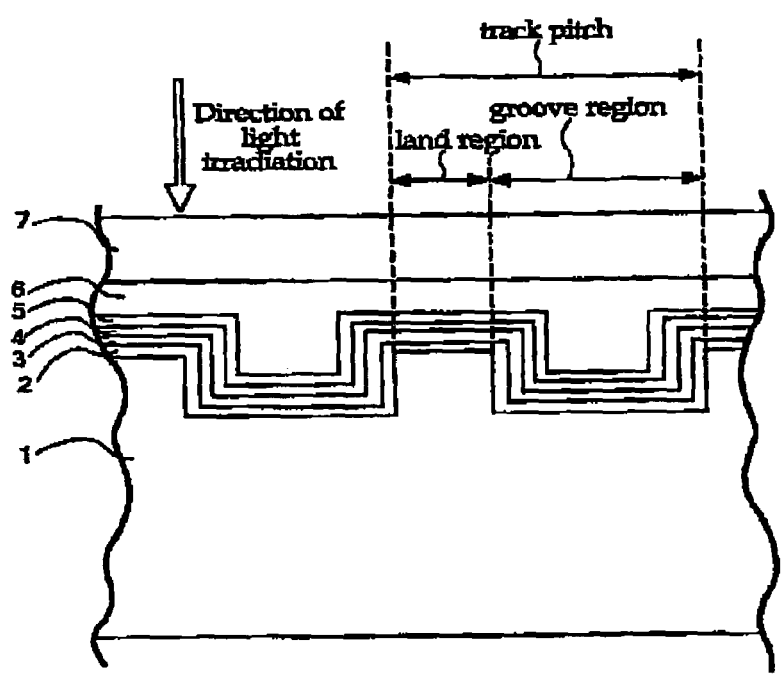
FIG. 1 is a cross sectional view showing an example of a layer structure in an optical recording medium of the present invention.

FIG. 1 is a typical partial sectional view of the optical recording medium in the present invention, comprising a substrate (1)/ a light reflection layer (2)/ first protection layer (3)/ recording layer (4)/second protection layer (5). Either a coated layer (protection coating layer (6)) coated by ultra-violet hardening or a thermosetting type resin (which will be described later), or a cover layer (7) bonded with an adhesive layer (6), is formed on the top of the layer (above the second protection layer (5)). The hard coating is coating comprising a layer coated with an ultraviolet or thermosetting resin on the cover layer (7).

The order of each layer illustrated in FIG. 1 is suitable for irradiating a converging light beam for recording and reproducing, for example a laser beam, to the recording layer through the transparent substrate.

First of all, explaining the substrate (1), a transparent resin such as polycarbonate, acrylic fiber, polyolefin, and the like, or a clear glass can be used for the substrate (1). Especially, the most preferred material among them may be polycarbonate because it is most widely used for CDs, and inexpensive.

Grooves with a pitch width of 0.8 μm or less guiding the recording playback light are formed in the substrate (1). The grooves are not necessarily a geometrically rectangular or trapezoidal shape. The grooves may be formed by first forming a waveguide with a different refractive index, then forming a groove optically.

Next, the recording layer (4) in the present invention will be explained hereinafter. The recording layer (4) in the present invention is a phase change recording layer, and the preferable thickness is generally between the range of 5 nm to 100 nm. If the thickness is smaller than 5 nm, it is hard to obtain sufficient contrast and the crystallization speed tends to slow dawn. Hence it is difficult to delete the recorded information in a short time. On the other hand, if the thickness exceeds 100 nm, it is also hard to obtain an optical contact, which results in numerous cracks. Moreover, it is necessary to obtain sufficient contrast compatible enough with a playback-only disk such as a DVD and the like. In a high density recording that has a shortest mark length of 0.5 μm or less, it is thus considered preferable to use the layer thickness of 5 nm to 25 nm for the following reasons; the thickness of the recording layer (4) is preferably 5 nm or more from the viewpoints that the reflectivity is not too low, and that a non-uniform composition during the initial stage of a film growth and low film density is less likely to occur.

Moreover, the thickness is preferred to be 25 nm or less, more preferably 20 nm or less from the viewpoint of preventing the recording sensitivity from lowering because of increasing thermal capacity, of preventing a jitter from increasing due to increasing disorder of the edge of the amorphous mark caused by three-dimensional crystal growth, and of preventing overwrite-resistance from deteriorating due to the remarkable change in volume. Furthermore, the density of the recording layer is preferably 80% or more of the bulk density, more preferably 90% or more.

Using a technique of lowering the sputtering gas pressure (a noble gas such as Ar) or setting the substrate close in front of the target, the density of the recording layer (4) may be increased by increasing the amount of high energy Ar irradiated to the recording layer in a sputtering deposition method.

High energy Ar are either Ar ions that are irradiated to the target and the ions partially back-sputtered to reach the substrate because of the sputtering process, or Ar ions in a plasma which reach the substrate after being accelerated by the sheath voltages from all surfaces of the substrate. The irradiation effect of such a high energy noble gas is called atomic peening effect. Ar gas generally used in sputtering is mixed into the sputtered film by the atomic peening effect. The atomic peening effect can be estimated by the amount of Ar in the film. Namely, when the amount of Ar in the film is small, the high energy Ar irradiation effect is also small, and a film with a low density can be formed. On the other hand, if irradiation of high energy Ar becomes larger, the amount of Ar increases and the film density becomes also higher. However, the Ars mixed in the film are separated out as voids during overwriting, hence overwiring-resistance deteriorates. A suitable amount of Ar in the recording layer is from 0.1% by atom to 1.5% by atom or less. Moreover, high frequency sputtering is more preferable than direct current sputtering because a high-density film can be obtained with a smaller amount of Ar in a film.

A recording layer in the present invention consists of a thin film whose main component is an alloy with the above-mentioned compositions including the elements of Ge, Sb, and Te. Namely, the ratio of each element of Ge, Sb, and Te in the recording layer may be in the above-mentioned composition range. Other elements up to about a total of 10% by atom may also be added as needed. It may be possible to slightly control the optical constant by adding at least one element, chosen from 0.1% by atom to 5% by atom of O, N, and S. If other elements are added with the amount exceeding 5% by atom, it is not preferable because crystallization rates become lowered and deletion properties worsen.

Moreover, it is preferable that at least one element of V, Nb, Ta, Cr, Co, Pt, and Zr with 8% by atom or less is added to the layer in order to improve the age stability without lowering the crystallization speed during overwriting, more preferably from 0.1% by atom to 5% by atom. The total amount of those added atoms and Ge to SbTe is preferably 15% by atom or less. If the total amount of the added atoms and Ge is extremely large, the separation of the phases excluding a Sb phase is induced. If the content of Ge is from 3% by atom to 5% by atom, there are considerable effects by addition. In order to improve the age stability and to slightly control the refractive index, it is preferable to add at least one element of Si, Sn, and Pb with 5% by atom or less. The total content of those added atoms and Ge is preferably 15% by atom or less. Those elements comprise the same tetra-coordination network as Ge.

Adding Al, Ga, and In with 8% by atom or less has the effect not only on increasing the crystallizing temperature but also on decreasing jitter and on improving recording sensitivity. 6% by atom is more preferable because segregation is easy to generate. Moreover, the total content with Ge may be 15% by atom or less, more preferably 13% or less. Adding Ag with 8% by atom or less is also effective to improve the recording sensitivity. It is especially effective in the case including a Ge content of more than 5% by atom. However, addition of Ag exceeding 8% by atom is not preferable because it increases jitter and deteriorates the stability of the amorphous mark. If the total addition of Ag and Ga exceeds 15% by atom, it is also not preferable because precipitation is likely to occur. The most preferred Ag content is 5% by atom or less.

The state after formed of a recording layer (4) of in the present invention is generally amorphous. Therefore, it is necessary to form an initial state (un-recorded state) by crystallizing whole surface of the recording layer after a film is formed. An examples of initializing techniques is anneal at a solid phase. A preferable example is melt-recrystallization technique in which the recording layer is melted once and then cooled gradually to crystallize in the resolidification process. There is almost no nucleus of crystal growth right after forming the recording layer, and it is difficult to crystallize the layer in a solid state. However, the technique of melt-recrystallization makes it possible to create a small number of crystalline nuclei. Thereafter, the crystalline nuclei were melted, and then re-crystallized at high speed at which crystal growth is mainly carried out.

Moreover, in the recording layer in the present invention, a noise may be made if crystals formed by the melt-recrystallization process and those formed by the annealing process coexist due to different reflectivity. Initialization is preferably carried out by the melt-recrystallization process since the erased parts become crystals by melt-recrystallization during practical overwrite recording. At this time, the recording layer should be melted partially, and in 1 millisecond or shorter. This is because melting a wider area and taking a longer time to melt and cool-down may destroy each layer by the heat, and the surface of the plastic substrate may be deformed. In order to provide such a thermal history, it is preferable to irradiate a high output semiconductor laser with a radiation wavelength of about 600 nm to 1000 nm by focusing on a major axis of 100 µm to 300 µm and on a minor axis of 1 µm to 3 µm, and making short axial scans at a linear velocity of 1–10 m/s along the scanning axis. Even using the same focusing light, the circle-shaped light generates too wide melted region, easily cause re-amorphization, and induces widespread damages to the multilayer structure and substrate.

It can be confirmed that initialization was carried out by melt-recrystallization by the followings. Namely, after the initialization, a recording light with the recording power (Pw), which is strong enough to melt the recording layer, is focused into a spot whose diameter is 1.5 µm or less, and then is irradiated to the medium in a straight line with a constant linear velocity. If there is a guide groove, the irradiation may be carried out in the condition that a tracking servo and focus servo are covered on the track comprising the groove or between the grooves.

Thereafter, if the reflectivity in a deleted state obtained by irradiating the deletion light with deletion power (Pe) ($\leq$Pw) on the same track in a direct line can be almost the same as the reflectivity in a completely unrecorded initial state, it can be confirmed that the initialized state is the melt-recrystallization state. This is because the recording layer is melted once by the recording light irradiation, and the state completely recrystallized by irradiation of the deletion light goes through the process of melting by a recording light and the recrystallization by the deletion light, hence it is in a melted and recrystallized state. Almost identical values of the reflection ratio between one in an initialized state (Rini) and one in a melt-crystallized state (Rcry) means that the difference of both reflection ratios defined by (Rini−Rcry)/{(Rini+Rcry)/2} is 20% or less. In a case of solid phase crystallization by annealing, the difference of the reflection ratios is generally larger than 20%.

As shown in FIG. 1, the recording layer (4) in the present invention is inserted between the first protection layer (3) and the second protection layer (5), and is introduced on the surface (the groove-forming side) of the substrate (1). The first protection layer (3) is mainly effective for preventing the surface of the substrate (1) from deforming by high temperature during recording. Moreover, the second protection layer (5) has functions preventing interdiffusion between the recording layer (4) and the light reflection layer (2), controlling the deformation of the recording layer (4), and effectively releasing the heat to the light reflection layer (2).

Materials of the protection layers (3) and (5) may be selected from the viewpoints of a reflective index, a thermal conductivity, a chemical stability, a mechanical strength, adhesion, and the like. Metals with high transparency and a high melting point, and oxides of semiconductors, sulphides, nitrides, carbides, and fluorides such as Ca, Mg, Li, and the like generally can be used. However, after considering various materials, the inventors found out that a mixture of ZnS and $SiO_2$ is most preferable from the viewpoint of consistency with the materials constituting a recording layer (4) of the present invention. Not limited to these materials, the oxides, sulphides, nitrides, carbides, and fluorides do not necessarily take a stoichiometric composition, and they may be used by controlling the composition, or by mixing them in order to control refractive index. Moreover, as mentioned later, the first protection layer (3) may be a double layer structure comprising a intermediate layer besides the mixture layer of ZnS and $SiO_2$, where the intermediate layer comprises a material with higher thermal conductivity than the mixture layer of ZnS and $SiO_2$.

The functions and the like of the protection layer will be explained in detail hereinafter.

The layer structure of the present invention belongs to one of the layer structures called quenched structure. A quenched structure avoids the problem of recrystallization when forming the amorphous mark by accelerating heat release and adopting the layer structure that improves cooling rate during the recording layer resolidification, and it realizes high deletion ratio by rapid crystallization, at the same time. Therefore, the thickness of the second protection layer (5) is preferably 5 nm or more from the viewpoint of strength against deformation during the recording layer melting. 30 nm or less is preferable from the viewpoint of preventing the required power for recording from needlessly increasing because of an excessively large heat release effect.

The thickness of the first protection layer of the present invention strongly affects the durability in overwriting-resistance, and it is especially important to control deterioration of jitter. When a film is thicker than 30 nm, it generates a large temperature difference between the recording side of the first protecting layer (3) and the side of a reflecting layer (2). As a result, the protecting layer itself is likely to deform asymmetrically because of the difference in thermal expansion between both sides of the protection layer. Overwriting induces accumulation of microplastic deformation inside the protection layer and brings an increase of noise, which is not preferable. Applying the above mentioned recording layer in the present invention realizes low jitter at high density recording with the shortest mark length less than 0.3 µm. However, the investors have found that even the above-mentioned layer structure of the quenched structure may be paid more attention when a laser diode with short wavelength (for example, a wavelength of 410 nm or less) is used to realize high density recording. Especially, in the investigation of the properties of the 1 beam-overwrite using a small converging beam that has a wavelength shorter than 500 nm and a numerical aperture NA less than 0.55, it is known that rendering the temperature distribution even in the direction of the mark width is important to obtain high deletion ratio and wider deletion power margin.

An even temperature distribution is found to be important for an optical system for DVR using an optical system with the wavelength of 390 nm to 420 nm and NA of about 0.85. If a film-thickness of the first protection layer is more than 30 nm, it is difficult to obtain the sufficient effects on an even temperature distributions. Hence, the film thickness of the first protection layer is 30 nm or less, more preferably 25 nm or less. If the thickness is less than 5 nm, the delay effect of thermal conduction in the first protection layer is not sufficient, and recording sensitivity remarkably deteriorates. The thickness of the first protection layer is preferably 15 nm to 25 nm when the wavelength of the recording laser is in the range of 600 nm to 700 nm, and 5 nm to 20 nm with a wavelength of 350 nm to 600 nm, a more preferable value being 5 nm to 15 nm. Especially, regarding the high density mark length modulation recording using optical system for DVR with a wavelength of 390 nm to 420 nm and NA of around 0.85, a film with low thermal conducting properties is preferably used for the second protection layer (5), and the film thickness is preferably from 7 nm to 25 nm. Moreover, forming a protection layer with high thermal conductivity on the top of the second protection layer avoids releasing the heat during rapid recording and gradients heat. Therefore, it allows for rapid recording.

It is possible to improve deletion ratio and deletion power margin especially by applying a material having high thermal conductivity to the light reflection layer (2). According to an investigation, it is preferable to use a layer structure that can flatten not only the spatial and temporal temperature distribution along the film thickness, but also the temperature distribution in the direction of the film surface (vertical direction in the direction of the scanning recording beam) as much as possible to make an excellent deletion property of the recording layer of the present invention in a wide range of the deletion power.

The most preferable way is preparing a thin light reflection layer with high thermal conductivity and accelerating heat release selectively in the horizontal direction. The conventionally used quenched layer focuses only to the heat release to one dimension in the direction of the film thickness, which is indented to release the heat fast from the recording layer to the light reflection layer, and did not pay enough regard to flattening the temperature distribution in this planar direction.

In the present invention, the inventors tried to enlarge the width of the window for recrystallization, to increase the deletion ratio and the deletion power margin without melting and forming amorphous phase again by designing the layer structure of the optical recording medium appropriately and flattening the temperature distribution in the direction crossing the tracks in the medium.

Figure 2:
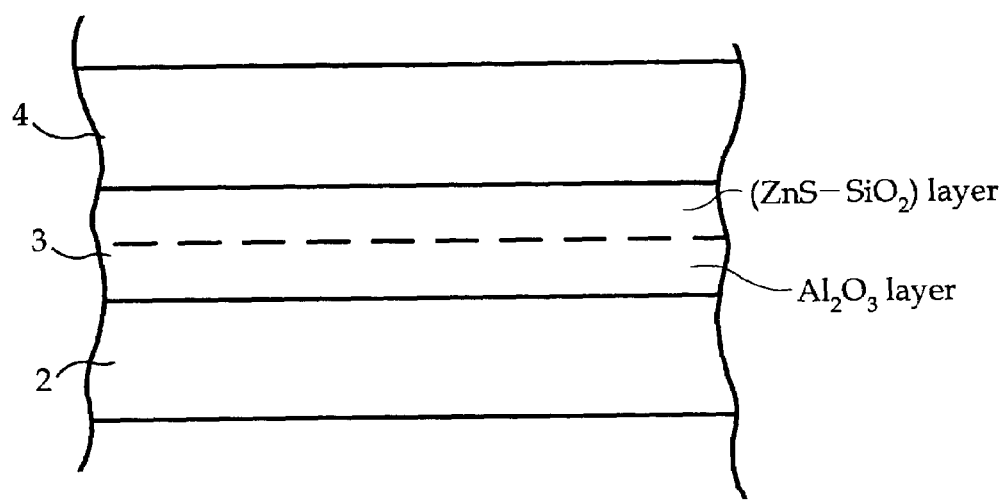
FIG. 2 is a cross sectional view showing a partial positional relationship between the first protection layer and the light reflection layer.

On the other hand, referring to FIG. 2, the first recording layer has two layers comprising a mixture layer of ZnS and $SiO_2$ and the intermediate layer (for instance, $Al_2O_3$) to accelerate heat release from the recording layer (4) to the light reflection layer (2) that has extremely high thermal conductivity by the very thin first protection layer (3) having low thermal conductivity. As a result, it was found out that the layers created an even temperature distribution in the recording layer. On the other hand, heat releasing in which the second protection layer (5) has high thermal conductivity accelerates the heat release effect, but the irradiated power required for recording increases when the heat release is accelerated too much. Consequently, the recording sensitivity decreases remarkably.

In the present invention, by providing an intermediate layer which comprises materials having high thermo-conductivity, heat focused and absorbed at the recording layer is not directly released to a metal, but to the intermediate layer and quenched, thus forming a recording medium recordable at high speed without sacrificing recording sensitivity.

Therefore, the preferable structure in the present invention comprises a first protection layer (3) having two layers, and a protection layer with low thermal conductivity. It is preferable that a protection layer with low thermal conductivity may be used on the side closer to the recording layer (4).

The thin protection layer with a low thermal conductivity gives a time delay for the heat transfer from the recording layer (4) to the light reflection layer (2) for several nsec to several tens of nsec at the beginning of recording power irradiation, and then it is possible to accelerate heat release to the light reflection layer (2). Therefore, it prevents a decrease of the recording sensitivity caused by heat release more than needed. The conventionally known protection layers whose main components are $SiO_2$, $Ta_2O_5$, $Al_2O_3$, AlN, SiN, and the like, are not preferable for independent use because of too high thermal conductivity. However, applying a material having high thermal conductivity to a layer, which lies on the side of the light reflection layer between the two layers in the first protection layer, makes it possible to record at high speed. In the above-mentioned materials, AlN is the preferable material as the layer comprising a high thermal conductivity material because of the compatibility with Ag alloy when an Ag alloy is used for the heat release layer. Additionally, when an Al alloy is used for the heat release layer, compatible $Al_2O_3$ with the Al alloy that has stability in sputtering, and can be formed by RF film forming is also a preferable material. Moreover, when an Al alloy is used for the heat release layer, $Ta_2O_5$ that is compatible with the Al alloy, has stability in sputtering, and can be fabricated by DC film fabrication is also a preferable material.

First of all, recording is carried out by using the low thermal conductivity layer comprising ZnS—$SiO_2$, and, during heat release, heat can be quenched not by the metal layer directly but by the intermediate layer comprising AlN, $Al_2O_3$, and $Ta_2O_5$ that has high thermal conductivity. Therefore, it is possible to produce a fast recordable recording medium without deteriorating recording sensitivity.

Figure 4:
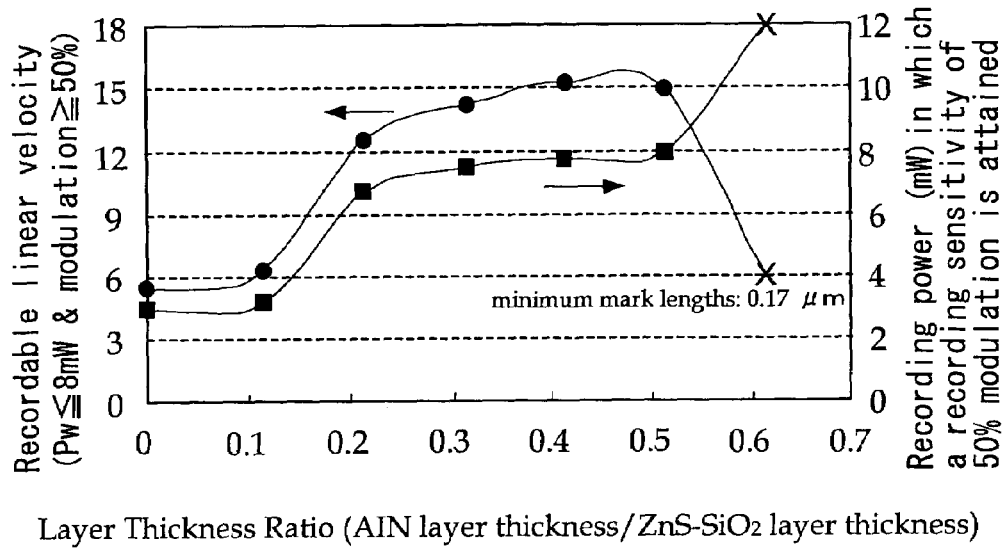
FIG. 4 is a view showing a relationship among the thickness ratio between the AlN and the ZnS—SiO$_2$ layers, the recordable speed, and the recording sensitivity.
Figure 5:
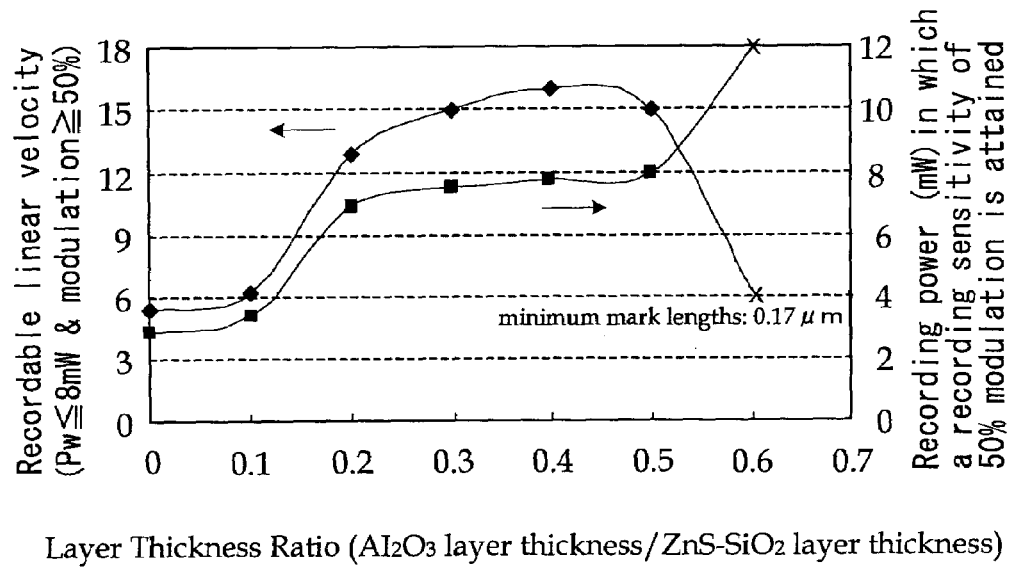
FIG. 5 is a view showing a relationship among the thickness ratio between the Al$_2$O$_3$ and the ZnS—SiO$_2$ layers, the recordable speed, and the recording sensitivity in the first protection layer.
Figure 6:
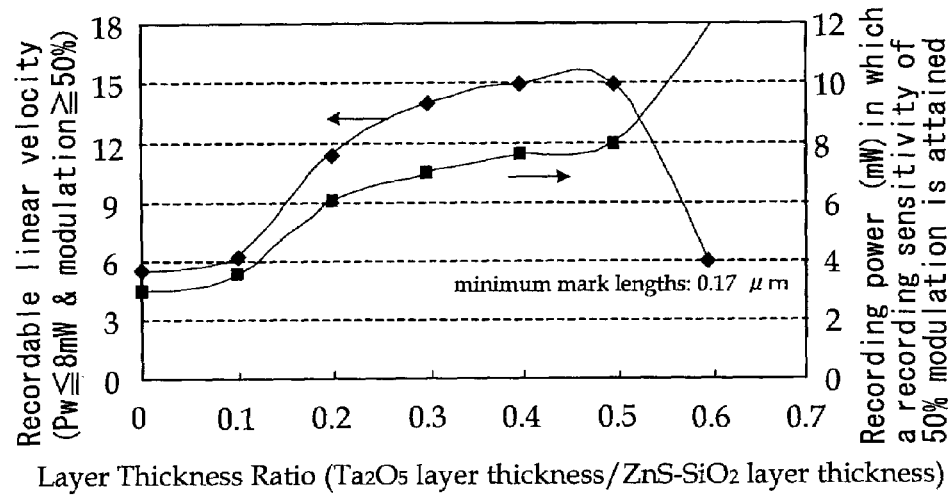
FIG. 6 is a view showing a relationship among the thickness ratio between the Ta$_2$O$_5$ and the ZnS—SiO$_2$ layers, the recordable speed, and the recording sensitivity in the first protection layer.

FIGS. 4, 5, and 6 each shows the relationship between the thickness ratios (thickness of intermediate layer/thickness of ZnS—$SiO_2$), the recordable linear velocity, and the recording sensitivity. FIG. 4 illustrates a case using AlN for the intermediate layer. FIG. 5 illustrates a case using $Al_2O_3$ for the intermediate layer. FIG. 6 illustrates a case using $Ta_2O_5$ for the intermediate layer.

When a modulation of 50% or more is obtained, the difference of the reflectivity between the crystal phase and amorphous phase begins to increase rapidly, and the recording and reproducing property reaches a tolerance limit (the area where the error becomes the order of $10^6$). Moreover, because the recording power becomes the greatest outgoing radiation power of 8 mW on the medium surface when a blue purple LD is used under the conditions of NA=0.85 and beam diameter ($1/e^2$) of about 0.4 μm, a large difference between crystal and amorphous phases such as 8 mW or less of recording sensitivity and 50% or more of modulation is necessary.

When the thickness ratio of the intermediate layer and ZnS—SiO$_2$ layer (the thickness of intermediate layer/the thickness of ZnS—SiO$_2$ layer) in the first protection layer is ⅕ (0.2) or more, the recordable linear velocity may be rapidly accelerated under the condition of 8 mW or less recording power and 50% or more modulation. Moreover, the recording linear velocity can be twice as fast as the medium which does not have the intermediate layer. Furthermore, the thickness ratio of ½ (0.5) is preferable from the viewpoint of the recording sensitivity and the recording linear velocity.

Namely, the range of the thickness ratio of two layers (the thickness of intermediate layer/ the thickness of ZnS—SiO$_2$ layer) in the first protection layer may be in the range of ⅕ to 1/1, preferably ⅕ to ½, more preferably ¼ to ½, and most preferably ¼ to 3/7 to record with excellent recording sensitivity (8 mW or less) and remarkably high linear velocity.

By defining the thickness ratio of the intermediate layer to the ZnS—SiO$_2$ layer, improvements in the recording density and the recording speed are achieved. Specifically, the thickness ratio of the intermediate layer to the ZnS—SiO$_2$ layer (expressed by ZnS—SiO$_2$: intermediate layer) is preferably made 5:5 to 8:2, and more preferably 7:3 to 8:2, while the thickness of the ZnS—SiO$_2$ layer is preferably 10 μm to 12 μm, and more preferably 10 μm. The thickness of the intermediate layer is preferably 6 μm to 1 μm, and more preferably 5 μm to 2 μm.

On the other hand, the heat release in the light reflection layer can be achieved by increasing the film thickness of the light reflection layer. However, if the light reflection layer is thicker than 300 nm, heat conduction becomes evident in the direction of film thickness rather than in the direction of the recording layer surface. Hence, there is no improvement on temperature distribution in the direction of the film surface. Moreover, the heat capacity of the light reflection layer itself becomes larger and both cooling the light reflection layer and the recording layer require time, which prevents the amorphous mark structure from forming.

In the present invention, a so-called "Super-quenching structure considering a heat conduction delay effect in the first protection layer" is more effective than the conventional GeTe—Sb$_2$Te$_3$ recording layer when it is applied to the recording layer in the present invention. The reason is that crystal growth during re-solidification at the near-field of Tm is rate-limiting of the recrystallization in the recording layer in the present invention. The super-quenching structure is effective in increasing the cooling rate to the limit at the near-field of Tm, in order to ensure and define the formation of the amorphous mark and the edge. In addition, the super-quenching structure is effective from the viewpoints that an even temperature distribution in the direction of the layer surface allows for rapid deletion by more definite recrystallization, which was originally rapidly deletable at the near-field of Tm.

In the present invention, as mentioned above, a material with a low heat conduction property is preferable as the material of the second protection layer (5), and the appropriate heat conduction property is $1 \times 10_{-3}$ pJ/(μm·K·nsec). However, it is difficult to measure the thermal conductivity of a thin film comprising such low thermal conductivity material. Instead, the appropriate heat conduction property can be obtained by measuring the results of thermal simulation and the actual values of recording sensitivity.

Examples of preferable material for the second protection layer with a low thermal conductivity include a composite dielectric that includes at least one type selected from ZnS, ZnO, TaS$_2$, and a rare earth sulfide with the amount of 50% by mol to 90% by mol, and contains a heat-resistant compound having a melting point or decomposition point of 1000° C. or more.

More specific examples preferably include a composite dielectric containing sulfides of the rare earths such as La, Ce, Nd, Y, and the like with the preferable amount of 60% by mol to 90% by mol. It is preferable that the range of the chemical composition of one of ZnS, ZnO and rare earth sulfide is 70% by mol to 90% by mol.

As a heat-resistant compound with a melting point or decomposition point of 1000° C. or higher to be mixed with these materials, one of the oxides, nitrides, or carbides of Mg, Ca, Sr, Y, La, Ce, Ho, Er, Yb, Ti, Zr, Hf, V, Nb, Ta, Zn, Al, Si, Ge, Pb and the like, and fluorides of Ca, Mg, and Li, and the like may be used.

Especially, SiO$_2$ is preferable as a material mixed with ZnS, and this combination is considered to be the most suitable in the present invention.

Moreover, in the present invention, both the first protection layer and the second protection layer use a mixture of ZnS and SiO$_2$ as mentioned above. Using the same materials for both of the layers has advantages with respect to cost reduction in manufacturing.

Next, the light reflection layer will be explained hereinafter.

The feature of the present invention is to accelerate the heat release effect in the horizontal direction, using a light reflection layer (2) as thin as 300 nm or less with an extremely high thermal conductivity. Generally, the thermal conductivity of a thin film is quite different from that of the bulk and the thermal conductivity with thin film is usually smaller. Especially, a film thinner than 40 nm is not preferable, in which a thermal conductivity might be as small as single digit-down or less, due to the island structure effect in the initial stage of crystal growth. Moreover, the crystallinity and the amount of impurities depend on the film growth condition, which causes differences in the thermal conductivity even in films having the same composition.

In order to control the highly thermally conductive light reflection layer (2) exhibiting excellent properties in the present invention, it is possible to directly measure the thermal conductivity of the light reflection layer (2), and it is possible to estimate the quality of the thermal conductivity using electrical resistance. In a material like a metallic film in which electrons mainly control thermal and electrical conductivity, thermal conductivity and electric conductivity have a good relative relationship. The electric resistance of a thin film is shown by a value of resistivity normalized by the film thickness and an area of the measured region. The volume resistivity and the sheet resistivity can be measured by the four probe method provided in JIS K 7194. Using this method, data that are very convenient and reproducible can be obtained by measuring the thermal conductivity of a thin film.

A preferable light reflection layer (2) in the present invention has a volume resistivity of 20 nΩ·m to 150 nΩ·m, more preferably 20 nΩ·m to 100 nΩ·m. A material with a volume resistivity of 20 nΩ·m or less is difficult to obtain in practice in a thin film state. Even in the case where the layer has a volume resistivity larger than 150 nΩ·m, the sheet resistivity can be decreased when the film grows thicker (for example, thicker than 300 nm). However, according to the inventors' investigation, sufficient heat release effect could not be obtained in such a high volume resistive material even if only the sheet resistivity is decreased. This is because the heat capacity per unit area increases in a thick film. Additionally, such a thick film is not preferable from the viewpoint of the manufacturing cost because it requires more time to produce and the material cost also increases. Moreover, the microscopic flatness of the film surface also worsens. A low volume conductive material to obtain the sheet conductivity of 0.2 Ω/□ to 0.9 Ω/□, is preferable. The most preferable value is 0.5Ω/□.

In the present invention, the preferable materials for the light reflection layer will be described hereinafter.

For instance, the materials may be an Ag—Cu alloy and an Al—Cu alloy including Cu of 0.3% by weight to 5.0% by weight.

When AlN is used for the material of the intermediate layer material in the first protection layer, an Ag—Cu alloy containing Cu of 0.5% by weight to 4.0% by weight is preferable as the light reflection layer that satisfies in good balance of all the properties of the corrosion resistance, adhesion, and high thermal conductivity.

Moreover, an Ag—Pd—Cu alloy that contains Si of 0.3% by weight to 0.8% by weight, and Pd of 0.3% by weight to 1.2% by weight.

Furthermore, an Ag—Cu alloy including Cu of 0.5% by weight to 0.8% by weight is also preferable as the light reflection layer that satisfies in good balance of all the properties of corrosion resistance, adhesion, and high thermal conductivity.

Moreover, an Ag alloy adding one element from Ti, V, Ta, Nb, W, Co, Cr, Si, Ge, Sn, Sc, Hf, Pd, Rh, Au, Pt, Mg, Zr, Mo or Mn to Ag with the content of 0.2% by atom to 5% by atom or is also preferable. When temporal stability is more important, the more preferable additive is Pd.

Additionally, when $Al_2O_3$ or $Ta_2O_5$ is used for the materials of the intermediate layer material in the first protection layer, an Al—Cu alloy including Cu of 0.5% by weight to 4.0% by weight is also preferable as the light reflection layer (2) that satisfies in good balance of all the properties of corrosion resistance, adhesion, and high thermal conductivity. Moreover, an Al—Mg—Si alloy that contains Si of 0.3% by weight to 0.8% by weight, and Mg of 0.3% by weight to 1.2% by weight.

Furthermore, an Al alloy including one of Ta, Ti, Co, Cr, Si, Sc, Hf, Pd, Pt, Mg, Zr, Mo or Mn with the amount of 0.2% by atom to 2% by atom can be used considering the durability, the volume resistivity, and the film deposition rate and the like, in which the volume resistivity increases proportionally to the concentration of added element and hillock-resistance is also improved. Hillock-resistance of an Al alloy containing less than 0.2% by atom added impurity depends on the deposition condition, although, it is often not sufficient. Moreover, when the content of added impurity is larger than 2% by atom, the above-mentioned low resistivity cannot be obtained. When more focus is put upon age stability, the more preferable addition is Ta.

Additionally, when $Al_2O_3$ or $Ta_2O_5$ is used for the materials of the intermediate layer material in the first protection layer, an AlTa alloy including Ta of 0.5% by weight to 0.8% by weight is also preferable as the light reflection layer (2) that satisfies in good balance of all the properties of corrosion resistance, adhesion, and high thermal conductivity. Moreover, adding Ta of only 0.5% by atom provides a preferable effect on production, which is the film deposition rate during sputtering increases 30% to 40% compared with using pure Al and Al—Mg—Si alloy.

When the above-mentioned Ag alloy is applied to the light reflection layer, the preferable film thickness is 30 nm to 200 nm. Even for pure Ag, the heat release effect is not sufficient in the case of a film thickness less than 30 mm. A film thickness thicker than 200 nm does not contribute to improving the horizontal temperature distribution because the heat is released in the perpendicular direction rather than the horizontal direction, and unnecessary film thickness reduces productivity. Additionally, the microscopic evenness of the film surface becomes worse.

When the above-mentioned Al alloy is applied to the light reflection layer (2), the preferable film thickness is 100 nm to 300 nm. Even for pure Al, the heat release effect is not sufficient in the case of a film thickness less than 150 nm. A film thickness thicker than 300 nm does not contribute to improving the horizontal temperature distribution because the heat is released in the perpendicular rather than the horizontal direction, and the cooling rate in the recording layer slow down because of the large heat capacity of the light reflection layer (2). Additionally, the microscopic evenness of the film surface deteriorates.

The inventors confirmed that the volume resistivity increases proportionally to the concentration of added elements for the above-mentioned Al and Ag. It is generally considered that addition of impurities decreases grain size and increases electron scattering at grain boundaries, and eventually decreases thermal conductivity. Controlling the amount of added impurities is necessary to obtain the intrinsic high thermal conductivity of the base material by increasing the grain size. The light reflection layer is formed by a sputter and vacuum evaporation process in general. In addition to the amount of impurities in the target and evaporation materials, all of the impurities should be controlled to be less than 2% by atom, including the amount of moisture and oxygen contained therein during film-forming. For this reason, it is preferable to control the ultimate vacuum to be $1 \times 10^{-3}$ Pa or less. Moreover, when film formation is carried out in an ultimate vacuum lower than $10^{-4}$ Pa, it is preferable to control the film-forming rate to be faster than 1 nm/sec, more preferably 10 nm/sec or more, in order to prevent impurities from being contained.

In the case where the intentionally added element includes more than 1% by atom, preventing the additional impurities as much as possible is preferable by using a film-forming rate of 10 nm/sec or more. There is a case where the film-forming condition affects the grain size with no relation to the amount of impurities. For instance, in an alloy film to which about 2% by atom Cu was added into Ag or Al, an amorphous phase exists in the grain boundary but the ratio of crystalline phase to amorphous phase depends on the film-forming condition. Moreover, sputtering at lower pressure produces a higher ratio of crystalline phase, which results in a decrease in the volume resistivity and an increase in the thermal conductivity. The composition of impurities and the crystallinity also depend on the manufacturing process of the alloy target and sputtering gas (Ar, Ne, Xe, and the like). Thus, the volume resistivity of the thin film is not controlled only by the metallic materials and the composition. In order to obtain high thermal conductivity, reducing the amount of impurities is preferable. However, the appropriate composition should be selected considering the balance of both Al and Ag, because pure metals such as Al and Ag have lower corrosion resistance and hillock-resistance.

Forming a multilayer structure in the light reflection layer is also effective to obtain higher heat conduction and reliability. In this case, at least one layer practically controls the heat release effect as the above-mentioned low volume resistive material having a film thickness thicker than 50% of the total light reflection layer, and other layers are formed to contribute to improving corrosion resistivity, adhesion with the protection layer, and hillock resistance. More specifically, Ag having the highest thermal conductivity and the lowest volume resistivity tend to be incompatible with a protection layer including S and it tends to deteriorate relatively fast for overwriting. Moreover, there is a tendency that the Ag corrodes in an accelerated test environment with high humidity and temperature. Therefore, it is effective to use Ag and Ag alloy as a low volume resistivity material and to introduce, between the multilayer and the upper protection layer, an alloy layer mainly containing Al with a thickness of 1 nm to 100 nm as the interface layer. If the thickness is controlled to be 5 nm or more, it is easy to uniformly form the layer without forming the island structure.

Moreover, in the case where an Ag alloy is used as the light reflection layer, forming the interface oxidation layer by oxidizing the Ag surface thicker than 1 nm is more preferable because interdiffusion occurs relatively easily in Ag. Increasing the thickness of the interface oxidation layer more than 5 nm, especially more than 10 nm, is not preferable because such a thick layer results in thermal resistance and loss of the function as a light reflection layer with the intended extremely high heat dissipation. Forming a multilayer structure in the light reflection layer is effective to obtaining a desired sheet resistivity in a desired film thickness by combining a high volume resistivity material with a low volume resistivity material. Using an alloy target can make the sputtering process easier, in which the volume resistivity is controlled by alloying. However, it may become a factor that increases the target manufacturing cost and material cost of the medium. Therefore, it is useful that the multilayer comprising a thin film of pure Al or pure Ag, and a film of the additional atoms is formed to obtain a desired volume resistivity. If the number of layers is around 3, it may be possible to save the cost of each medium, even though the initial equipment cost increases. It is preferable that the light reflection layer consists of a multilayer light reflection layer made of several metallic films, that the total film thickness is 40 nm to 300 nm, and that 50% or more of the thickness of the multilayer light reflection layer consisting of a metallic thin film layer (which may be a multilayer) with the volume resistivity is from 20 nΩ·m to 150 nΩ·m.

In the case Ag alloy is used as the light reflection layer, forming AlN layer between the light reflection layer and the ZnS—SiO$_2$ layer is reliable and preferable from the viewpoint of preventing sulfurization by directly contacting the layer with ZnS.

What is more effective than a multilayer comprising mere heat radiation layers is to form a intermediate layer of AlN, Al$_2$O$_3$, or Ta$_2$O$_5$ in the middle of the light reflection layer and the recording layer, in which the intermediate layer has a thermal conductivity between the ZnS—SiO$_2$ layer containing light reflection layer and the protection layer, and has a greater transmittance than the light reflection layer, and a higher film deposition rate.

Figure 7:
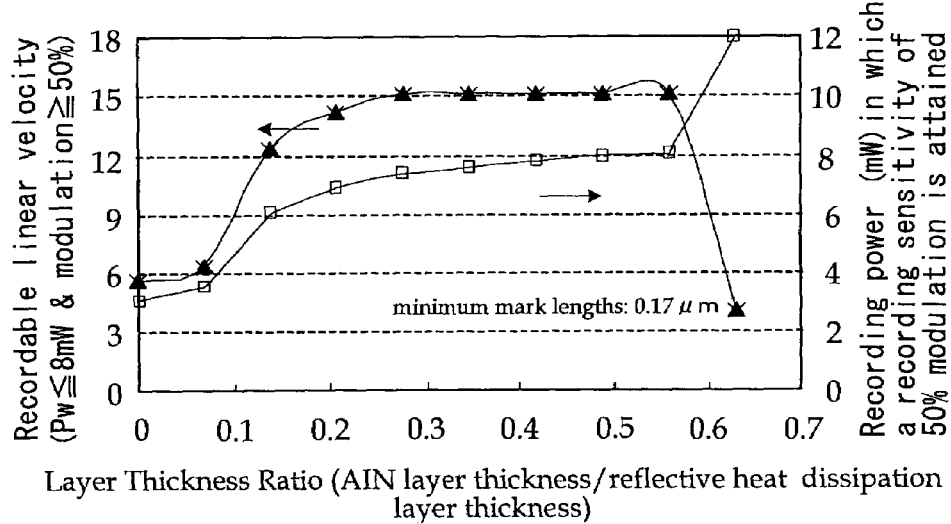
FIG. 7 is a view showing a relationship among the thickness ratio between the AlN and the light reflection layers, the recordable speed, and the recording sensitivity.
Figure 8:
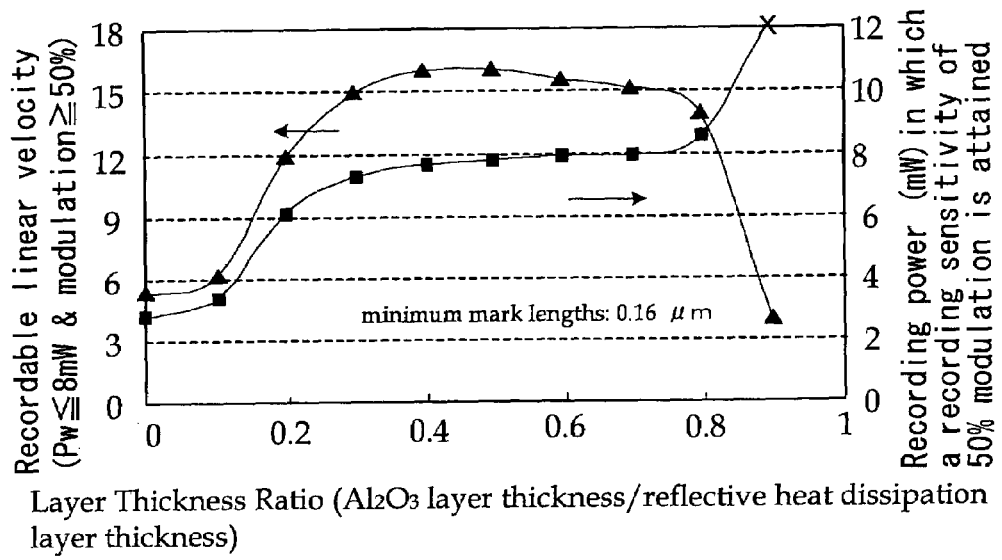
FIG. 8 is a view showing a relationship among the thickness ratio between the $Al_2O_3$ and the light reflection layers, the recordable speed, and the recording sensitivity.
Figure 9:
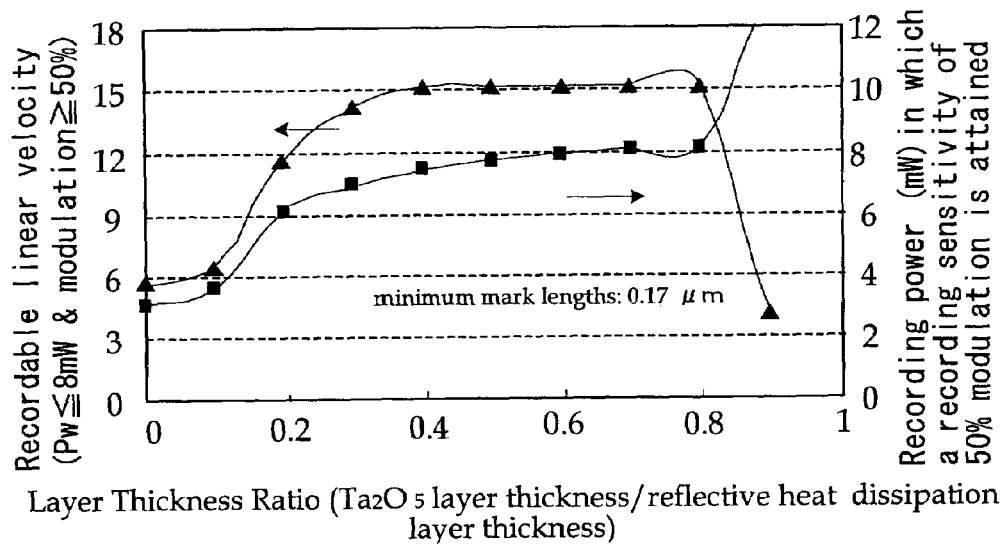
FIG. 9 is a view showing a relationship among the thickness ratio between the $Ta_2O_5$ and the light reflection layers, the recordable speed, and the recording sensitivity.

FIGS. 7, 8, and 9 each shows a thickness ratio (thickness of the intermediate layer/thickness of the light reflection layer), recordable linear velocity (Pw≦8 mW & modulation≧50%), and recording sensitivity (recording power (mW) able to obtain 50% modulation). FIG. 7 illustrates a case using AlN. FIG. 8 illustrates a case using Al$_2$O$_3$. FIG. 9 illustrates a case using Ta$_2$O$_5$.

When the thickness ratio of the light reflection layer and the intermediate layer comprising AlN, Al$_2$O$_3$ or Ta$_2$O$_5$ is 0.2 or more, the recordable linear velocity may become nearly twice as fast as the high-speed recording of 0.1 or less.

This means that this effect makes it possible to successfully transfer the heat from an Al alloy and Ag alloy, both of which are metals with higher thermal conductivity, by controlling the film thickness of the intermediate layer with excellent thermal conductivity. Moreover, modulation may not be obtained, since a thickness ratio larger than 0.8 worsens the recording sensitivity.

As the result, it is possible to produce fast recordable medium with excellent recording sensitivity by controlling the thickness ratio of the light reflection layer and the intermediate layer to from 0.2 to 0.8.

Sheet-shape is preferable for a structure having a cover layer (7) (referring to FIG. 1), because a film thickness of 0.3 mm or less, more preferably 0.06 mm to 0.20 mm, is required in the case of using an object lens with high NA. As the material, a polycarbonate resin, acrylic resin, epoxy resin, a polystyrene resin, an acrylonitrile-styrene copolymer resin, a polyethylene resin, a polypropylene resin, a silicone resin, a fluorine resin, an ABS resin, the urethane resin, and the like may be used, but the preferable materials are a polycarbonate resin and acrylic resins, both of which are superior in terms of optical properties and cost. As a method of forming a thin substrate with the above-mentioned transparent sheets, an example includes the method to paste a transparent sheet, using an ultraviolet curing resin or a transparent two-sided adhesive sheet. Moreover, instead of the cover layer, it may be useful to create a thin substrate having a protective coating layer formed by coating and hardening an ultraviolet hardening resin on the protection layer.

A hard coating may be formed on the cover layer (7). The hard coating must be an ultraviolet hardening resin with a thickness of 10 µm or less, in order to control the mechanical properties such as hardness, which must be hard enough not to incur damage by pencil hardness H or harder, face distortion, tilt, and the like.

For instance, forming a film with a thickness of 1 µm by Mitsubishi rayon MH7617N (a product of Mitsubishi Rayon Co., Ltd.) as an ultraviolet curing resin, results in strength against both dust and damage. The thickness of the hard coating formed in MO or the like is generally 5 µm or more. Forming such a thick film easily generates unevenness of film thickness. In the present invention, the inventors selected the film thickness of less then 5 µm, and succeeded in forming a film in a thickness with the reduced uneven film thickness, in which the surface hardness is maintained, and mechanical properties such as face distortion, and tilt do not worse deteriorate.

Table 1 shows the thickness of the hard coating and the jitter properties (inner radius, middle radius, and outer radius) of the disk. Since the hard coating is applied by spin coating and the film thickness of the outermost side becomes thicker, the jitter deteriorates to 9% or more (clock data) when the thickness of the hard coating is 6 µm (setting).

The hard coating with a thickness of 5 µm (setting) is a limitation to obtain the jitter property of 9% or less. The hard coating may be coated with a speed of about 70 cps to coat a thickness less than 5 µm uniformly, although the way of coating become changed depending on viscosity. In the case of the film thickness of 0.5 μm or less, the effect of forming the hard coat layer may not be obtained because of insufficient mechanical strength.

TABLE 1

The evaluation results whether the jitter is 9% or more, at inner, middle, and outer radii of the hard coat thickness (μm).

| | |
|---|---|
| 10 | X |
| 9 | X |
| 8 | X |
| 7 | X |
| 6 | X |
| 5 | Δ |
| 4 | ○ |
| 3 | ○ |
| 2 | ○ |
| 1 | ○ |
| 0.5 | Insufficient strength. It does not perform as a hard coat film. |

Measured position: Inner radius (r24 mm), Middle radius (r40 mm), outer radius (r58 mm)

Figure 3:
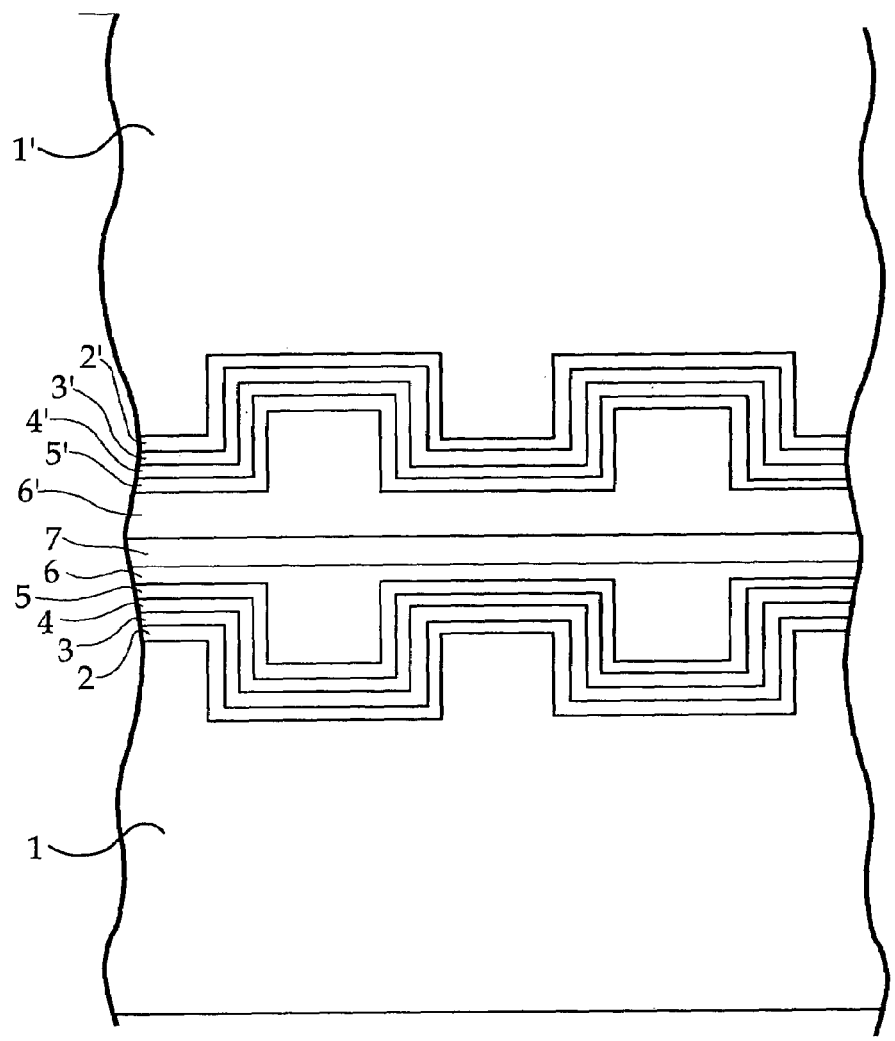
FIG. 3 is a cross sectional view showing another example of a layer structure in an optical recording medium of the present invention.

In FIG. 3, instead of the protection substrate (7) shown in FIG. 1, other optical recording medium is attached to the bottom of the optical recording medium enantiomprphically through the protection coat layer (6).

It comprises the substrate (1'), the light reflection layer (2'), the first protection layer (3'), the recording layer (4'), and the second protection layer (5'), all of which corresponds to substrate (1), the light reflection layer (2), the first protection layer (3), the recording layer (4), and the second protection layer (5) of the bottom optical recording medium, and both consist of the same materials and same layer thicknesses.

Thus, the optical recording medium may be protected. Additionally, the recording capacity may also be doubled.

The following explanation is about other properties of the present invention.

Figure 10:
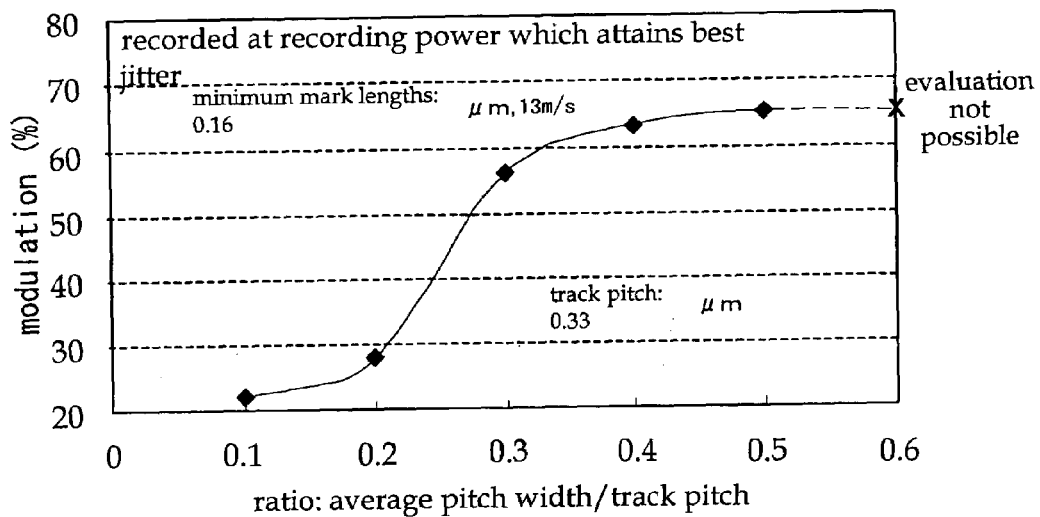
FIG. 10 is a view showing a modulation to the average groove width.

FIG. 10 shows the modulation obtained by recording with high-speed recording of 13 m/s and a minimum mark length of 0.160 μm with respect to the value in which the average groove width was divided by the track pitch. AlN is formed as the intermediate layer. The track pitch is 0.33 μm, and a groove recording is applied. The modulation exceeds 50% when the ratio (the value in which the average groove width is divided by the track pitch) becomes larger than 0.3. When the ratio becomes larger than 0.3, the modulation rapidly becomes larger. When a modulation of 50% or more is obtained, the difference of the reflection ratio between crystals and amorphous material rapidly becomes larger, which results in a region where the tolerance of good recording and reproducing characteristics is obtained (the region where error becomes the order of 106). Moreover, when the ratio (the value in which the average groove width is divided by the track pitch) became larger than 0.6, the land width became narrower, land width fluctuation became more evident in the stamper structure, and it was not possible to track due to instability. Therefore, in the present invention, the inventors selected the ratio (the value in which the average groove width is divided by the track pitch) to be 0.3 to 0.5. As a result, an excellent recording and reproducing property may be obtained because tracking becomes stable and modulation reaches 50% or more.

Figure 11:
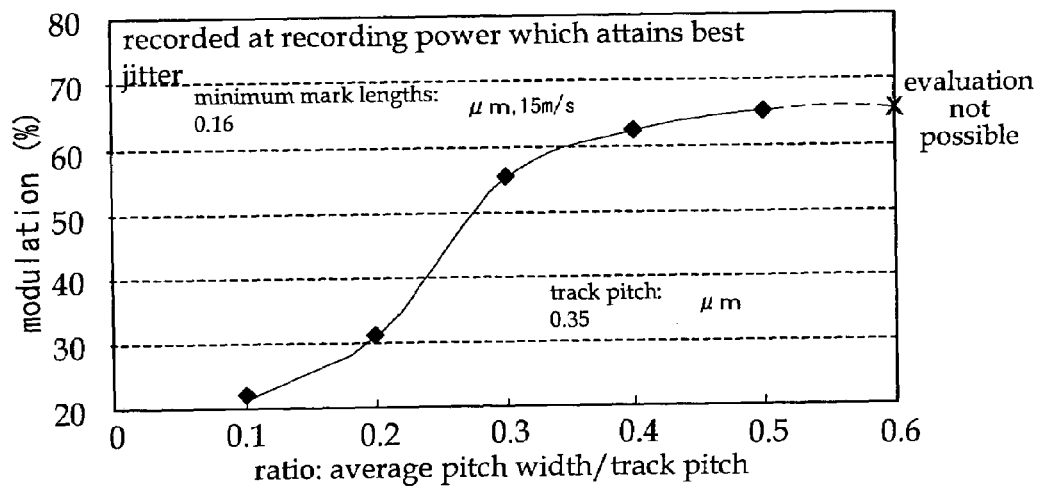
FIG. 11 is a view showing modulation to the average groove width.
Figure 12:
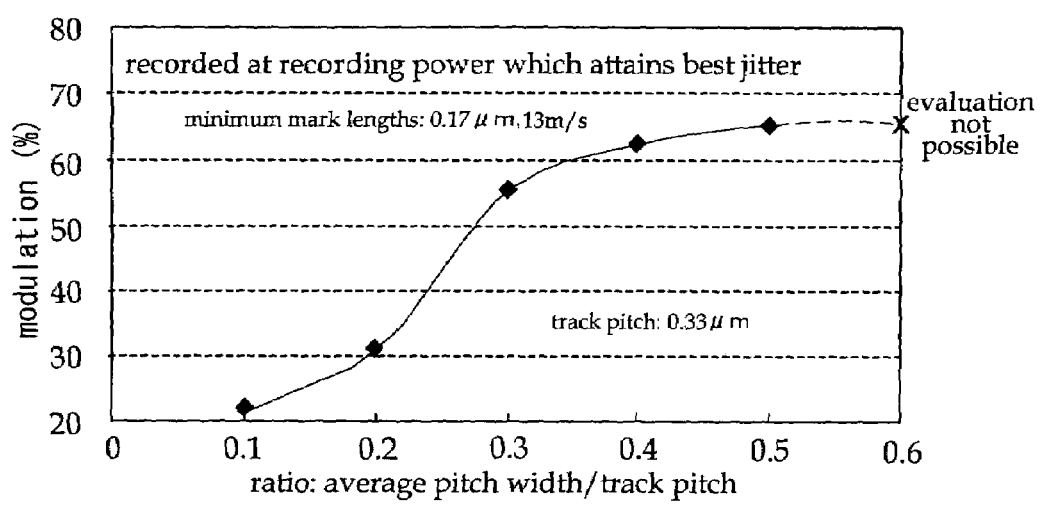
FIG. 12 is a view showing modulation to the average groove width.

FIG. 11 shows a similar illustration of the case where an $Al_2O_3$ layer is formed as the intermediate layer, however, rapid recording is 15 m/s, the minimum mark length is 0.160 μm, and track pitch is 0.35 μm. The results are the same as the above. Moreover, in FIG. 12 the modulation in the case where $Ta_2O_5$ layer is formed as the intermediate layer is shown in the same manner, however, rapid recording is 13 m/s, the minimum mark length is 0.130 μm/bit, and track pitch is 0.33 μm. The results are the same as the above.

EXAMPLE

Examples are described below in order to illustrate the present invention. However, it should be understood that the aspects of the present invention are not restricted to the following examples.

Example 1

Setting the track pitch at 0.32 μm, and a ratio at 0.46 (the value in which the average groove width 0.15 is divided by the track pitch 0.32), on a 1.1 mm thick disk-shaped polycarbonate substrate having 120 mm diameter, the layers were formed in the following order, by using sheet sputtering equipment: 120 nm thick light reflection layer (AgCu), 5 nm first protection layer comprising AlN, 12 nm thick (ZnS—$SiO_2$), 12 nm thick recording layer ($Ag_1In_3Sb_{70}Te_{23}Ge_3$), and 120 nm thick second protection layer (ZnS—$SiO_2$). In addition, a 60 μm polycarbonate cover layer was formed by a modified acrylic adhesive (a product of NittoDenko Co., Ltd., the brand name DA8310-A50), and a 1 μm thick layer was formed as the hard coating on the injection side of the disk (a product of Mitsubishi Rayon Co., Ltd. under the brand name MH7617N), obtaining the phase change optical disk according to the present invention with a final thickness of 1.2 mm. FIG. 1 shows the medium structure.

The evaluation was carried out under the condition of 15 m/s, line density 0.13 μm/bit, 405 nm, and NA=0.85.

Recording was multi-pulse with a recording power of 6 mW, and a deletion power of 3 mW (lead pulse width of 0.3 T, multipulse width of 0.3 T and off pulse of 0.8 T). Multipulse-offpulse bottom power was cooled down to 0.2 mW.

As a result, the preferable properties of 65% modulation and 6.9% jitter were obtained.

Comparative Example 1

Setting the track pitch at 0.32 μm, and a ratio at 0.46 (the value in which the average groove width 0.15 is divided by the track pitch 0.32), on a 1.1 mm thick disk-shaped polycarbonate substrate having 120 mm diameter, the layers were formed in the following order, by using sheet sputtering equipment: 140 nm thick light reflection layer (AgCu), 12 nm first protection layer comprising (ZnS—$SiO_2$), 12 nm thick recording layer ($Ag_1In_3Sb_{70}Te_{23}Ge_3$), and 120 nm thick second protection layer (ZnS—$SiO_2$). In addition, a 60 μm polycarbonate cover layer was formed by a modified acrylic adhesive (a product of NittoDenko Co., Ltd., the brand name DA8310-A50), and a 1 μm thick layer was formed as the hard coating on the injection side of the disk (a product of Mitsubishi Rayon Co., Ltd. under the brand name MH7617N), which resulted in obtaining the phase change optical disk according to the present invention with a final thickness of 1.2 mm.

Although having tried to record under the same conditions as those described in the example 1, the inventors were unable to record with 15 m/s.

Example 2

Setting the track pitch at 0.33 μm, and a ratio at 0.45 (the value in which the average groove width 0.15 is divided by the track pitch 0.33), on a 1.1 mm thick disk-shaped polycarbonate substrate having 120 mm diameter, the layers were formed in the following order, by using sheet sputtering equipment: 140 nm thick light reflection layer (AgP-dCu), 5 nm thick first protection layer comprising $Al_2O_3$, and 12 nm thick first protection layer ($ZnS$—$SiO_2$), and 120 nm thick second protection layer ($ZnS$—$SiO_2$). In addition, a 70 μm polycarbonate cover layer was formed by a modified acrylic adhesive (a product of NittoDenko Co., Ltd., the brand name DA8310-A50), and a 1 μm thick layer formed as the hard coating on the injection side of the disk (a product of Mitsubishi Rayon Co., Ltd. under the brand name MH7617N), which resulted in obtaining the phase change optical disk according to the present invention with a final thickness of 1.2 mm. FIG. 1 shows the medium structure.

The evaluation was carried out under the condition of 15 m/s, the shortest mark length 0.16 μm/bit, 405 nm, and NA=0.85.

Recording was multi-pulse with a recording power of 6 mW, and a deletion power of 3 mW (lead pulse width of 0.4T, multipulse width of 0.4 T and off pulse of 0.5 T). Multipulse-offpulse bottom power was cooled down to 0.2 mW.

As a result, the preferable properties of 63% modulation and 6.8% jitter were obtained.

Comparative Example 2

Setting the track pitch at 0.32 μm, and a ratio at 0.45 (the value in which the average groove width 0.15 is divided by the track pitch 0.33), on a 1.1 mm thick disk-shaped polycarbonate substrate having 120 mm diameter, the layers were formed in the following order, by using sheet sputtering equipment: a 140 nm thick light reflection layer (AgP-dCu), a 12 nm first protection layer comprising ($ZnS$—$SiO_2$), a 12 nm thick recording layer ($Ag_1In_3Sb_{70}Te_{23}Ge_3$), and a 120 nm thick second protection layer ($ZnS$—$SiO_2$). In addition, a 70 μm polycarbonate cover layer was formed by a modified acrylic adhesive (a product of NittoDenko Co., Ltd., the brand name DA8310-A50), and a 1 μm thick layer was formed as the hard coating on the injection side of the disk (a product of Mitsubishi Rayon Co., Ltd. under the brand name MH7617N), which resulted in obtaining the phase change optical disk according to the present invention with a final thickness of 1.2 mm.

Although having tried to record under the same conditions as those described in Example 2, the inventors were unable to record with 15 m/s.

Example 3

Setting the track pitch at 0.33 μm, and a ratio at 0.45 (the value in which the average groove width 0.15 is divided by the track pitch 0.33), on a 1.1 mm thick disk-shaped polycarbonate substrate having 120 mm diameter, the layers were formed in the following order, by using sheet sputtering equipment: a 140 nm thick light reflection layer (AgP-dCu), a 5 nm thick first protection layer comprising $Ta_2O_5$, and a 12 nm thick first protection layer ($ZnS$—$SiO_2$), and 120 nm thick second protection layer ($ZnS$—$SiO_2$). In addition, a 70 μm polycarbonate cover layer was formed by a modified acrylic adhesive (a product of NittoDenko Co., Ltd., the brand name DA8310-A50), and a 1 μm thick layer was formed as the hard coating on the injection side of the disk (a product of Mitsubishi Rayon Co., Ltd. under the brand name MH7617N), which resulted in obtaining the phase change optical disk according to the present invention with a final thickness of 1.2 mm. FIG. 1 shows the medium structure.

The evaluation was carried out under the condition of 13 m/s, the liner density 0.16 μm/bit, 405 nm, and NA=0.85.

Recording was multi-pulse with a recording power of 6 mW, and a deletion power of 3 mW (lead pulse width of 0.4 T, multipulse width of 0.4 T and off pulse of 0.5 T). Multipulse-offpulse bottom power was cooled down to 0.2 mW.

Comparative Example 3

Setting the track pitch at 0.32 μm, and a ratio at 0.45 (the value in which the average groove width 0.15 is divided by the track pitch 0.33), on a 1.1 mm thick disk-shaped polycarbonate substrate having 120 mm diameter, the layers were formed in the following order, by using sheet sputtering equipment: a 140 nm thick light reflection layer (AgP-dCu), a 12 nm first protection layer comprising ($ZnS$—$SiO_2$), a 12 nm thick recording layer ($Ag_1In_3Sb_{70}Te_{23}Ge_3$), and a 120 nm thick second protection layer ($ZnS$—$SiO_2$). In addition, a 70 μm polycarbonate cover layer was formed by a modified acrylic adhesive (a product of NittoDenko Co., Ltd., the brand name DA8310-A50), and a 1 μm thick layer was formed as the hard coating on the injection side of the disk (a product of Mitsubishi Rayon Co., Ltd. under the brand name MH7617N), which resulted in obtaining the phase change optical disk according to the present invention with a final thickness of 1.2 mm.

Although having tried to record under the same conditions as those described in Example 3, the inventors were unable to record with 13 m/s.

As clearly shown in the above detail and specific illustrations, in an optical recording medium according to claim 1 in the present invention, effective rapid recording can be obtained without decreasing the recording sensitivity by comprising dual layer structure having a intermediate layer comprising AlN, $Al_2O_3$ or $Ta_2O_5$ and a $ZnS$—$SiO_2$ layer to make the protection layer between the light reflection layer and the recording layer to be a quenching structure.

The invention claimed is:

1. An optical recording medium comprising:
   a substrate;
   a light reflection layer;
   a multi-layer first protection layer;
   a recording layer containing a phase-change material which changes between crystalline and amorphous phases by a light irradiation;
   a second protection layer; and
   one of a cover layer and a protective coating layer disposed on the substrate in this order; wherein,
   the light reflection layer comprises one of an Al alloy and an Ag alloy;
   the multi-layer first protection layer comprises (i) a $ZnS$—$SiO_2$ mixture layer which contains a mixture of ZnS and $SiO_2$ and (ii) between the $ZnS$—$SiO_2$ mixture layer and the Al or Ag alloy light reflection layer an intermediate layer comprising one of a $Ta_2O_5$ layer or an AlN layer;
   a film-thickness of the first protection layer is 25 nm or less;

the recording layer comprises Ge, Sb, and Te as main elements; and the second protection layer comprises a mixture of ZnS and $SiO_2$; and the intermediate layer has a thickness ⅕ to ½ times a thickness of the ZnS—$SiO_2$ mixture layer.

2. An optical recording medium according to claim 1, wherein the light reflection layer comprises an Ag alloy, and the intermediate layer of the first protection layer comprises AlN.

3. An optical recording medium according to claim 1, wherein the light reflection layer comprises an Al alloy, and the intermediate layer of the first protection layer comprises $Ta_2O_5$.

4. An optical recording medium according to claim 1, wherein the intermediate layer in the first protection layer has a thickness 0.20 to 0.80 times a thickness of the light reflection layer.

5. An optical recording medium according to claim 1, wherein a film-thickness of the first protection layer is 5 nm to 25 nm.

6. An optical recording medium according to claim 5, wherein a film-thickness of the first protection layer is in a range from 7 nm to 25 nm.

7. An optical recording medium according to claim 1, wherein a film-thickness of the second protection layer is 5 nm to 30 nm.

8. An optical recording medium according to claim 1, wherein a thickness of the light reflection layer is 30 nm to 300 nm, and a volume resistivity of the light reflection layer is 20 nΩ·m to 150 nΩ·m.

9. An optical recording medium according to claim 1, further comprising a cover layer, wherein the cover layer is formed on an adhesive layer.

10. An optical recording medium according to claim 9, wherein a hard coating is formed on the cover layer.

11. An optical recording medium according to claim 10, wherein a film-thickness of the hard coating is 1 μm to less than 5 μm.

12. An optical recording medium according to claim 1, wherein the substrate is provided with a groove whose average groove width is 0.3 or more to 0.5 or less with respect to the track pitch.

13. An optical recording medium according to claim 12, wherein the groove is one of a geometric groove and an optically formed groove.

14. An optical recording medium comprising:
a substrate;
a light reflection layer;
a multi-layer first protection layer;
a recording layer;
a second protection layer; and
one of a cover layer and a protective coating layer disposed on the substrate in this order; and the optical recording medium utilizes a phase-change phenomenon which results in changes between crystalline and amorphous phases by a light irradiation, wherein, the light reflection layer comprises an Ag alloy;

the multi-layer first protection layer comprises a ZnS—$SiO_2$ mixture layer which contains a mixture of ZnS and $SiO_2$, and an AlN layer formed between the ZnS—$SiO_2$ mixture layer and the Ag alloy light reflection layer;

a film-thickness of the first protection layer is 25 nm or less;

the recording layer comprises Ge, Sb, and Te as main elements; and the second protection layer comprises a mixture of ZnS and $SiO_2$; and the AlN layer has a thickness ⅕ to ½ times a thickness of the ZnS—$SiO_2$ mixture layer.

15. An optical recording medium, comprising:
a substrate;
a light reflection layer;
a multi-layer first protection layer;
a recording layer;
a second protection layer; and
one of a cover layer and a protective coating layer disposed on a substrate in this order; and the optical recording medium utilizes a phase-change phenomenon which results in changes between crystalline and amorphous phases by a light irradiation, wherein, the light reflection layer comprises an Al alloy;

the multi-layer first protection layer comprises a ZnS—$SiO_2$ mixture layer which contains a mixture of ZnS and $SiO_2$ and a $Ta_2O_5$ layer formed between the ZnS—$SiO_2$ mixture layer and the Al alloy light reflection layer;

a film-thickness of the first protection layer is 25 nm or less;

the recording layer comprises Ge, Sb, and Te as main elements; and the second protection layer comprises a mixture of ZnS and $SiO_2$; and the $Ta_2O_5$ layer has a thickness of ⅕ to ½ times a thickness of the ZnS—$SiO_2$ mixture layer.

* * * * *